Dec. 24, 1935.       P. D. CANNON       2,025,039
ARTICLE OF MANUFACTURE AND METHOD OF MAKING THE SAME
Filed March 23, 1933

INVENTOR
Phillip D. Cannon.
BY D. N. Halstead
ATTORNEY

Patented Dec. 24, 1935

2,025,039

UNITED STATES PATENT OFFICE 2,025,039

ARTICLE OF MANUFACTURE AND METHOD OF MAKING THE SAME

Phillip D. Cannon, Plainfield, N. J., assignor to Johns-Manville Corporation, New York, N. Y., a corporation of New York Application March 23, 1933, Serial No. 662,225

10 Claims. (Cl. 28—1)

This invention relates to an article of manufacture and method of making the same, and particularly to an improved friction material suitable for use as automotive brake lining or clutch facing.

Compounds of rubber or the like are much used in friction materials. There is difficulty, however, in impregnating the optimum proportion of such compounds into an integral 1-ply woven fabric base of adequate thickness. As a result, there is resorted to the expedient of forming a multiply article comprising several relatively thin layers of fabric, coated individually with rubber compound over their several exterior surfaces and then composited together. While such a composited product may contain a suitable proportion of the friction compound, the product is liable to separation into its constituent laminae when subjected to such severe uses as must be withstood by present-day automotive friction materials.

It is an object of the present invention to overcome the difficulties in making or disadvantages in such articles. Additional objects and advantages will appear from the following description and the appended claims.

Briefly stated, the invention comprises intercrossed strands of suitable yarn, such as wire-reenforced asbestos yarn, and a plurality of inwardly disposed elongated masses of friction compound, preinserted originally in self-sustaining condition, forming a fabricated article including face and back portions that are structurally continuous with each other at their two side edges and are tied together by binder threads at close intervals from edge to edge. In the preferred embodiment, the inwardly disposed friction compound is in the form of a plurality of strips, preferably inserted originally as stuffer or filler strands in a woven band or listing, and the product contains additional friction compound initially applied over the outer surface. The invention comprises, also, the method of making such a product which includes intercrossing strands of wire-reenforced asbestos or the like, as by weaving or braiding, simultaneously introducing self-sustaining strips of hardenable friction compound, impregnating the resulting product with exteriorly applied friction compound, and shaping the final article as by compression in a die. When the friction compound is one adapted to be hardened, say a vulcanizable rubber compound, the final article is preferably subjected to hardening, as for example, by vulcanization.

The invention is illustrated in the attached drawing, in which:

In the various figures like reference characters denote like parts. Figs. 1–6 are partly diagrammatic.

There are shown warp strands 1, filling strands 2, and binder strands or threads 3. In articles for use as brake lining, clutch facing, or the like, these strands should be relatively strong and heat-resistant. Such a material is asbestos yarn containing wire-reenforcement, such as one or more strands of fine brass wire and frequently referred to as "wire-inserted" asbestos yarn.

There are also shown inwardly disposed, closely spaced elongated masses 4 of friction compound. These masses in the article as originally fabricated are suitably a plurality of approximately parallel strips in spaced relationship to each other, extending longitudinally between the face and back portions of the article. These strips may be preformed and preinserted in convenient manner as stuffer strands at the time the strands of asbestos yarn or the like are being intercrossed to form the fabricated article.

It will be observed that the binder threads in the woven listing illustrated in Figs. 1–5 tie or lace the face and back portions together at close intervals from edge to edge, and that the binder threads pass through the spaces between the several discrete strips of friction compound.

Figure 1:
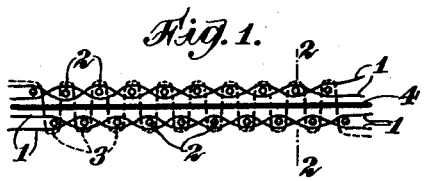
Fig. 1 shows a longitudinal sectional view of a 2-ply fabric constructed in accordance with the present invention.
Figure 2:
Fig. 2 shows a transverse sectional view on lines 2—2 of Fig. 1.
Figure 3:
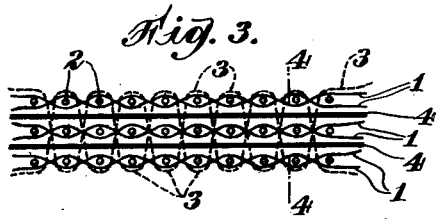
Fig. 3 shows a longitudinal sectional view of a 3-ply fabric containing two sets of stuffer strands of friction compound.
Figure 4:
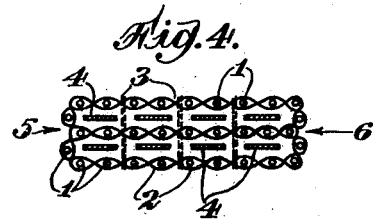
Fig. 4 shows a transverse sectional view on line 4—4 of Fig. 3.

It will be observed also that the strips of friction compound may constitute a single set of stuffer strands, as illustrated in Figs. 1 and 2, or a plurality of sets in the multiply articles shown in Figs. 3 and 4.

The strips of friction compound referred to should be self-sustaining, that is, adapted to be manipulated in weaving or braiding without excessive breakage or deformation, in distinction from a fluid compound such as a solution of a friction compound in a large proportion of liquid solvent. Such self-sustaining strips are to be distinguished also from compounds supported as a coating upon a strand of yarn or the like. The strips are suitably plastic to the degree that they may be deformed and impregnated into adjacent yarn during the pressing operation which will be referred to later.

It will be observed that the face and back portions of the article are structurally continuous at the two edge portions 5 and 6, since the filler strands pass from face to back at the said edge portions, and that the article resembles somewhat a flattened tube in which the face and back portions are not only continuous at their edges but also are held together at close intervals from edge to edge, by means of the binder threads. It will be apparent also that such a structure is adapted to prevent separation of the face from the back. The structure is adapted, likewise, to prevent separation within the face or back, inasmuch as the face and back are each integrally fabricated. Such a structure is to be distinguished from one in which separate strips are adhered together to form an apparently continuous face or back.

Figure 5:
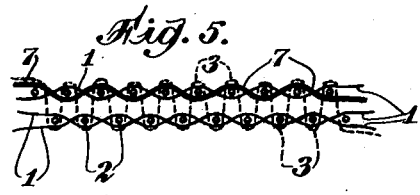
Fig. 5 shows a longitudinal sectional view of a modification of the invention in which strands of friction compound are used as warp threads.

In the modification illustrated in section in Fig. 5 there is formed a structure similar to that illustrated in Figs. 1 and 2, except that the strips of friction compound are incorporated as warp threads 7, forming a part of the face or back of the article.

Figure 6:
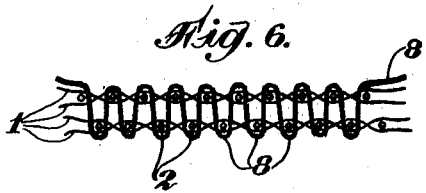
Fig. 6 shows a longitudinal sectional view of a modification in which strips of friction compound are used as binder threads.

In the modification illustrated in Fig. 6, the strips of friction compound are used as binder threads 8, to replace part of the wire-reenforced asbestos binder threads 3. In such a structure the preinserted friction compound extends throughout the article from face to back.

The friction compound constituting these strips, illustrated in Figs. 5 and 6, is preferably one that is relatively strong and tough.

Figure 7:
Fig. 7 shows a transverse sectional view of a finished article suitable for use as automotive brake lining.

Fig. 7 shows in section a finished article adapted for use as a brake lining and containing exteriorly applied friction compounds 9, in addition to the preinserted strips 4. This article has also been compressed and the friction compound therein hardened, as will be described later.

Figure 9:
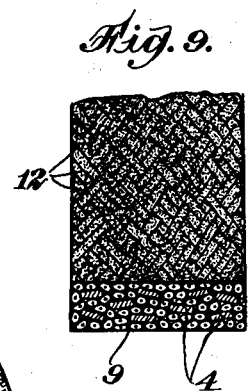
Fig. 9 shows a perspective view, with parts broken away for clearness of illustration, of an embodiment in which a braided product contains friction compound introduced into the braid originally as self-sustained strips.
Figure 8:
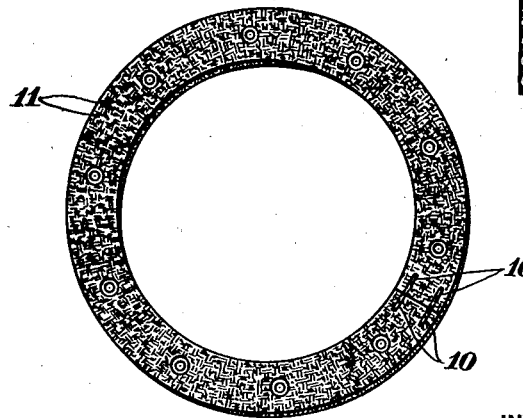
Fig. 8 shows, in perspective, a finished clutch facing made in accordance with the present invention.

The making of the improved article of the present invention will be illustrated by specific examples of the formation of the articles illustrated in the intermediate or development stage in Figs. 1, 2, and 9 and in the finished condition in Figs. 7 and 8.

Using conventional equipment, including a narrow fabric loom adapted for use in weaving brake lining from wire-reenforced asbestos yarn, there is formed a brake lining listing or band consisting of a double plain weave with additional series of binder threads interlacing the face and back portions in predetermined manner and positions and tying the face and back portions together at close intervals from edge to edge. At the time this band is being woven, a plurality of strips of rubber friction compound are incorporated or preinserted as stuffer strands between the face and back portions, as illustrated.

These strips of rubber binder compound may be formed by sheeting a suitable plastic compound between calender rolls, to form a thin sheet, and then cutting the sheet into long strips of desired breadth and thickness. Strips that have been used to advantage are approximately $\frac{1}{16}$ inch wide by $\frac{1}{16}$ inch thick. Such preformed strips are fed to the loom from a conventional creel, the feeding of such strips and weaving of the product being done with conventional equipment.

The product from the loom has the structure illustrated in Figs. 1 and 2. Such a product or that shown in Figs. 3-6 may be used directly as packing, in cases where porosity of the surface layers is not objectionable and where it is desirable to have inwardly disposed strips of material adapted to undergo vulcanization during use. Suitably, however, such material for other purposes is finished into friction material. Thus, it is supplied with an exterior coating of friction compound 9 that may have the same composition as the non-volatile ingredients in the preinserted strips. The friction compound may be applied to the exterior by being calendered in plastic condition thereupon in conventional manner, or by being coated thereupon in the form of a cement, say a solution of approximately 25 parts of non-volatile ingredients to 75 parts of volatile solvent such as gasoline. When the latter method is used, the resulting product is subjected to a drying operation to evaporate the volatile solvent, say at an elevated temperature.

The friction compound used should be one that may be hardened subsequent to its incorporation into the article, as for example, incompletely polymerized chloroprene and ingredients commonly used in rubber compounding, or a rubber compound itself, including rubber, vulcanization materials, and other conventional ingredients. The compounds mentioned may include reenforcing fibers of asbestos or the like.

The article containing the inwardly disposed and exteriorly applied friction compound is subjected to finishing operations including suitably shaping, strongly compressing, and hardening of the friction compound. Thus, the product may be placed in dies of desired dimensions and shape, compressed, say to one-half to two-thirds of the original thickness of the band, and the rubber or other friction compound hardened in situ, as at an elevated temperature, to induce vulcanization or polymerization or remove volatile solvents. During this treatment, the friction compound applied to the exterior and that preinserted become integrally united and welded together. This union is particularly thorough when the compound is applied to the exterior in the form of a solution or cement which softens the preinserted strips.

The asbestos yarn to be woven or braided may be moistened, as by passage over a rotating burlap-covered roll dipping at its lower side into water, all in accordance with conventional procedure and with conventional equipment.

When the product is to be used for brake lining, the established shape may be a straight band of approximately rectangular cross section. When the product is to be used for clutch facing, the shape may be that of the closed ring, as illustrated in Fig. 8, the abutting ends of the ring being held together by clinched brass staples 10 and the product being ground over its surface to give the exact dimensions desired and/or to expose portions of the reenforcing wires as illustrated at 11.

A product so made may contain a very large and desirable proportion of friction compound, say, at least 30 parts by weight of compound to 70 of yarn. Thus, a typical brake lining may contain 48 parts by weight of yarn, 30 parts of preinserted rubber friction compound, and 22 parts of additional friction compound, on the solvent-free basis, applied over the outer surfaces and forced inwardly by the pressing operation, to give a total of approximately equal weights of compound and yarn. During the pressing operation the friction compound, including that inserted during the weaving and that exteriorly applied, distributes itself and impregnates adjacent portions of the yarn. The finished article may contain a relatively higher proportion of rubber in the central portion and in the exterior surface portions than in the face and back portions of the woven fabric.

In making the multiply modifications, such as the 3-ply product shown in Figs. 3 and 4, the method and equipment described above are modified in a manner that will occur to one skilled in the art, whereby a multiply weave is produced and a series of stuffer strands is introduced between each ply.

The general method of intercrossing strands of asbestos yarn, which has been illustrated by the weaving process, may be made also by braiding, as, for example, by the machine described in U. S. Patent 1,885,676 issued to Blaisdell on November 1, 1932. In the braiding, the strips of rubber compound may constitute the "filler threads" described by Blaisdell. The braided product may be coated over its exterior and finished as described above. Such a product in unfinished form is illustrated in Fig. 9 which shows the strands 12 of yarn intercrossed by braiding and stuffer strands 4 consisting of strips of friction compound of character described. The braided fabric is integral, in that face and back portions are thoroughly laced together when made as described by the said Blaisdell patent. The braided product is coated exteriorly with additional friction compound and finished as described in the case of the woven product.

It will be understood that the term "preformed" as applied to the friction compound means that the friction compound is formed or shaped before being fabricated into the unit. The term is not intended to mean that there is no distortion of the friction compound from the original form during the pressing or other finishing operations applied to the article originally fabricated.

The term "self-sustaining", as applied to the masses or strips of friction compound, means that the friction compound itself imparts the strength and shape-retaining property, at the time of the original fabrication by weaving or braiding, as distinguished from a friction compound coated upon and supported by a strong reenforcing core material, such as wire-reenforced asbestos yarn.

The details that have been given are for the purpose of illustration and not restriction. Many variations therefrom may be made within the scope of the appended claims.

What I claim is:

1. A friction material adapted for use as automotive brake lining, comprising woven strands of wire-reenforced asbestos yarn forming a fabricated article including face and back portions, masses of self-sustaining friction compound inserted as a plurality of preformed strips between the said face and back portions, binder strands tying the face and back portions together at close intervals between the positions of insertion of the said strips, and additional friction compound disposed over the exterior surface of the said fabricated article, the preinserted and also the additional friction compound being in the condition of having been forced into the said face and back portions of the article, integrally united to each other, and hardened in situ.

2. A friction material adapted for use as automotive brake lining, comprising woven strands of wire-reenforced asbestos yarn forming a fabricated article including face and back portions, strips of self-sustaining plastic rubber friction compound inserted as a plurality of preformed stuffer strands between the said face and back portions, binder strands tying the face and back portions together, and additional rubber friction compound disposed over the exterior surface and impregnated into the interior of the said fabricated article.

3. A friction material adapted for use as automotive brake lining, comprising woven strands of wire-reenforced asbestos yarn forming a fabricated article including face and back portions, strips of self-sustaining friction compound inserted as a plurality of preformed plastic stuffer strands between the said face and back portions, binder strands tying the face and back portions together at positions between the positions of insertion of the said stuffer strands, and additional friction compound disposed over the exterior surface of the said fabricated article, the said preinserted and also the additional friction compound being in the condition of having been forced into the said face and back portions of the article, integrally united to each other, and hardened in situ.

4. A friction material comprising intercrossed strands of fibrous material forming a fabricated article, structurally integral from face to back and side to side, and a plurality of closely spaced preformed, elongated, self-sustaining masses of friction compound disposed within the said article.

5. A friction material comprising intercrossed strands of wire-reenforced asbestos yarn forming an article including integrally fabricated face and back portions, structurally continuous with each other at their two side edges, and a plurality of closely spaced discrete, elongated, self-sustaining masses of friction compound disposed between the said face and back portions.

6. A friction material comprising woven strands of wire-reenforced asbestos yarn forming a fabricated article including integrally woven face and back portions, structurally continuous with each other at their two side edges, and a plurality of closely spaced approximately parallel strips of self-sustaining plastic rubber friction compound disposed between the said face and back portions and integrally united thereto.

7. A friction material comprising intercrossed strands of wire-reenforced asbestos yarn forming a fabricated article including face and back portions structurally continuous with each other at their two side edges, a plurality of discrete, elongated, self-sustaining masses of friction compound arranged side by side, in spaced relationship to each other, between the said face and back portions, and binder strands tying the face and back portions together at positions between the said parallel strips.

8. In making a friction material, the method which comprises weaving strands of wire-reenforced asbestos yarn into a multiply brake lining weave, engaging therein binder threads extending from face to back of the band and securing together the face and back portions, simultaneously introducing as stuffer strands a plurality of approximately parallel strips of plastic hardenable friction compound in self-sustaining condition, causing filler strands to pass from face to back of the said weave at the side edges thereof, to form a fabricated article including intergrally woven face and back portions tied together at close intervals from edge to edge and structurally continuous at their two side edges and including also inwardly disposed strips of friction compound, applying additional hardenable friction compound in flowable condition to the exterior of the fabricated article, compressing and shaping the product, and hardening the friction compound therein and thereon.

9. The method of making an article of manufacture which comprises intercrossing strands of wire-reenforced asbestos yarn to form a band, causing strands of yarn to pass through the band from face to back at close intervals from edge to edge, simultaneously introducing within the band a plurality of closely spaced strips of friction compound in self-sustaining condition, applying additional friction compound to the exterior of the thus formed article, and causing the said strips and the exteriorly applied compound to unite integrally with each other.

10. In making a friction material, the method which comprises braiding strands of wire-reenforced asbestos yarn into a multiply brake lining braid, engaging therein binder threads extending from face to back of the band and securing together the face and back portions, simultaneously introducing into the braid a plurality of spaced, preformed strips of plastic hardenable friction compound in self-sustaining condition, causing strands to pass from face to back of the said braid adjacent to the side edges thereof, to form a fabricated article including face and back portions tied together at close intervals from edge to edge and structurally continuous at their two side edges and including also inwardly disposed strips of friction compound, applying additional hardenable friction compound in flowable condition to the exterior of the fabricated article, compressing and shaping the product, and hardening the friction compound therein and thereon.

PHILLIP D. CANNON.